US010389776B2

(12) United States Patent
Brown et al.

(10) Patent No.: US 10,389,776 B2
(45) Date of Patent: Aug. 20, 2019

(54) MEDIA STREAMING USING HYBRID P2P AND CLIENT-SERVER DISTRIBUTION OF CONTENT

(71) Applicant: International Business Machines Corporation, Armonk, NY (US)

(72) Inventors: Michael Sean Brown, Wahroonga (AU); Sean R. Costello, Leichhardt (AU); Stefan Harrer, Hampton (AU); Laurence J. Plant, North Balwyn (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 560 days.

(21) Appl. No.: 15/224,067

(22) Filed: Jul. 29, 2016

(65) Prior Publication Data
US 2018/0034873 A1    Feb. 1, 2018

(51) Int. Cl.
*H04L 12/26*     (2006.01)
*H04L 29/06*     (2006.01)
*H04L 29/08*     (2006.01)

(52) U.S. Cl.
CPC .......... *H04L 65/4076* (2013.01); *H04L 43/08* (2013.01); *H04L 65/4084* (2013.01);
(Continued)

(58) Field of Classification Search
CPC ... H04L 67/2842; H04L 43/08; H04L 65/403; H04L 65/80; H04L 65/4084;
(Continued)

(56) References Cited

U.S. PATENT DOCUMENTS 7,010,578 B1 *  3/2006  Lewin ................. G06F 16/9577
                                                    709/217
8,046,453 B2   10/2011  Olaiya
(Continued)

OTHER PUBLICATIONS

Ha et al., "A Novel Hybrid CDN-P2P Mechanism for Effective Real-Time Media Streaming", [online], [retrieved on Jan. 3, 2016]. Retrieved from the Internet: <URL: http://www-npa.lip6.fr/~fourmaux/Stages/HA.ACM_Rapport.pdf>.
(Continued)

*Primary Examiner* — Sargon N Nano
(74) *Attorney, Agent, or Firm* — Law Offices of Ira D. Blecker, P.C.

(57) ABSTRACT

Hybrid device for viewing media content which includes a media player to present the media content to a viewer; a non-transitory storage medium that stores instructions; and a processor that executes the instructions to perform the following functions: exception detection and handling to monitor a rate of media streaming and to identify when viewing of the media content is interrupted or predicted to be interrupted; a peer interaction manager having a signaling capability to broadcast a request to peers for media segments of the media content when viewing of the media content is interrupted or predicted to be interrupted; a peer media manager to receive the media segments from the peers and cache the media segments; and a media segment manager to stitch the media segments from different peers into a single continuous media file and insert the media file into the media player for playing to the viewer.

14 Claims, 5 Drawing Sheets

(52) U.S. Cl.
CPC .......... *H04L 65/80* (2013.01); *H04L 67/1042* (2013.01); *H04L 67/146* (2013.01); *H04L 67/2842* (2013.01)

(58) Field of Classification Search
CPC ............... H04L 67/104; H04L 67/1046; H04L 67/1042; H04L 67/1078; H04L 65/4076; H04L 67/146; H04N 21/632
See application file for complete search history.

(56) References Cited

U.S. PATENT DOCUMENTS

| | | | |
|---|---|---|---|
| 8,078,729 B2 | 12/2011 | Kozat et al. | |
| 8,332,484 B2* | 12/2012 | Afergan | H04L 29/08576 |
| | | | 709/218 |
| 8,935,315 B2 | 1/2015 | Hudson et al. | |
| 9,398,088 B2* | 7/2016 | De Foy | H04L 67/1063 |
| 9,813,284 B2* | 11/2017 | Afergan | H04L 29/08576 |
| 2008/0098123 A1 | 4/2008 | Huang et al. | |
| 2008/0134043 A1* | 6/2008 | Georgis | H04N 7/10 |
| | | | 715/733 |
| 2008/0155061 A1* | 6/2008 | Afergan | H04L 29/08576 |
| | | | 709/218 |
| 2008/0178094 A1 | 7/2008 | Ross | |
| 2010/0094972 A1* | 4/2010 | Zuckerman | H04L 67/1008 |
| | | | 709/219 |
| 2011/0093607 A1* | 4/2011 | Wang | H04L 65/4084 |
| | | | 709/231 |
| 2012/0167150 A1* | 6/2012 | Le Scouarnec | H04L 65/4084 |
| | | | 725/87 |
| 2013/0166659 A1* | 6/2013 | Champel | H04L 12/1881 |
| | | | 709/206 |
| 2016/0057185 A1* | 2/2016 | Zhang | H04W 4/027 |
| | | | 709/231 |

OTHER PUBLICATIONS

Zhang et al., "Unreeling Xunlei Kankan: Understanding Hybrid CDN-P2P Video-on-Demand Streaming", Multimedia, IEEE Transactions on, vol. 17, Issue: 2, Date of Publication: Dec. 18, 2014.
Xu et al., "A CDN-P2P Hybrid Architecture for Cost-Effective Streaming Media Distribution", [retireved on Jan. 3, 2016]. Retrieved from the Internet: <URL: https://www.cs.purdue.edu/homes/dxu/pubs/MMCN03-enhanced.pdf>.

* cited by examiner

MEDIA STREAMING USING HYBRID P2P AND CLIENT-SERVER DISTRIBUTION OF CONTENT

BACKGROUND

The present exemplary embodiments pertain to a hybrid P2P network for media streaming and, more particularly, pertain to a hybrid combination of a hierarchical content distribution network for media streaming based on a client-server architecture coupled with a dynamic P2P network.

The desire for high-quality, on-demand delivery of streaming multimedia and other rich digital content is a principal driving force in the continued development of the broadband Internet infrastructure. Indeed, with the growth of broadband connections, the number, scale, and diversity of multimedia content servers has rapidly increased. Streaming audio and video files, including entertainment, news broadcasts, and instructional programming are now sourced by a variety of mainstream Internet sites. Content delivery through streaming media is broadly recognized as one of the fastest growing technologies related to the Internet.

Distributed computer systems are well-known in the prior art. One such distributed computer system is a "content distribution network" or "CDN" that is operated and managed by a service provider. The service provider typically provides the service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS request handling, provisioning, data monitoring and reporting, content targeting, personalization, and business intelligence. The term "outsourced site infrastructure" means the distributed systems and associated technologies that enable an entity to operate and/or manage a third party's Web site infrastructure, in whole or in part, on the third party's behalf.

Media streaming refers to any downloading system for media (for example, video, audio) that allows the receiver to view the file as it is downloaded, rather than waiting for the entire file to download before playback begins.

Peer to peer (P2P) networks are also well-known in the prior art and have been used for file sharing and other purposes. A peer-to-peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

BRIEF SUMMARY

The various advantages and purposes of the exemplary embodiments as described above and hereafter are achieved by providing, according to an aspect of the exemplary embodiments, a hybrid device for viewing media content comprising: a media player to present the media content to a viewer; a non-transitory storage medium that stores instructions; and a processer that executes the instructions to perform the following functions: exception detection and handling to monitor a rate of media streaming and to identify when viewing of the media content is interrupted or predicted to be interrupted; a peer interaction manager having a signaling capability to broadcast a request to peers for media segments of the media content when viewing of the media content is interrupted or predicted to be interrupted; a peer media manager to receive the media segments from the peers and cache the media segments; and a media segment manager to stitch the media segments from different peers into a single continuous media file and insert the media file into the media player for playing to the viewer.

According to another aspect of the exemplary embodiments, there is provided a computer implemented hybrid method for viewing media content comprising: monitoring by a viewing device a rate of media streaming and identifying by the viewing device when viewing of the media content is interrupted or predicted to be interrupted; broadcasting by the media device a request to peers for media segments of the media content when viewing of the media content is interrupted or predicted to be interrupted; receiving by the media device the media segments from the peers and caching the media segments; and stitching by the media device the media segments from different peers into a single continuous media file and inserting the media file into a media player for playing to a viewer.

According to a further aspect of the exemplary embodiments, there is provided a computer program product for viewing media content, the computer program product comprising a computer readable storage medium having program instructions embodied therewith, the program instructions executable by a processor to cause the processor to perform a method comprising: monitoring a rate of media streaming and identifying when viewing of the media content is interrupted or predicted to be interrupted; broadcasting a request to peers for media segments of the media content when viewing of the media content is interrupted or predicted to be interrupted; receiving the media segments from the peers and caching the media segments; and stitching the media segments from different peers into a single continuous media file and inserting the media file into a media player for playing to a viewer.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

A viewer may wish to stream a performance such as a television show or movie from a content service provider over a network to a viewing device with a media player. Such a viewing device may be a handheld device such as a smartphone, a computer, a tablet, a set top box, etc.

While watching the performance, the performance may be interrupted by buffering. The buffering interruption may be caused by one or more of the viewing device running out of buffer, the network being constrained such as by lack of bandwidth and/or by the service provider's content distribution network (CDN) being constrained such as by receiving too many requests for performances by the service provider's subscribers.

Another problem that may occur is that after rewinding or forwarding, viewing may be interrupted as the viewing device may need to buffer to be able to play from the selected point after rewinding or forwarding. For rewinding, the viewing device may discard content that was just watched to save space. Content will need to be streamed again causing performance interruption even though it was just watched because the viewing device keeps clearing out of its buffers the content that was just watched. For forwarding, the viewing device waiting for new content to arrive from the CDN over the network may also cause a performance interruption.

The exemplary embodiments pertain to a device and a method for streaming media content to user viewing devices using a hybrid combination of a hierarchical content distribution network based on a client-server architecture coupled with a dynamic P2P network. The media content is typically streamed in segments. The viewing device controls the peer network (as opposed to the CDN controlling the peer network), sets up the peer network, receives the segmented media either from the CDN or the peer network, stitches the segments together into a continuous media file and then disbands the peer network.

The exemplary embodiments may include some or all of the following:

a combination of hierarchical content architecture for streaming and P2P media streaming to form a hybrid model;

predictive analytics applied to identifying when the viewing of the performance on the viewing device is likely to be interrupted;

a viewing device sending a beacon to one or more peer devices requesting assistance with a task;

all devices receiving the beacon identifying whether they can assist which may require a scheme for identifying the type of capability that is required;

dynamic real-time formation of a peer network of the one or more peer devices to aid streaming of the performance;

security enhancements to CDN server to enable the peer network to temporarily also receive streamed content directly from the CDN server;

tearing down the dynamic peer network when the performance interruption issue has passed.

Figure 1:
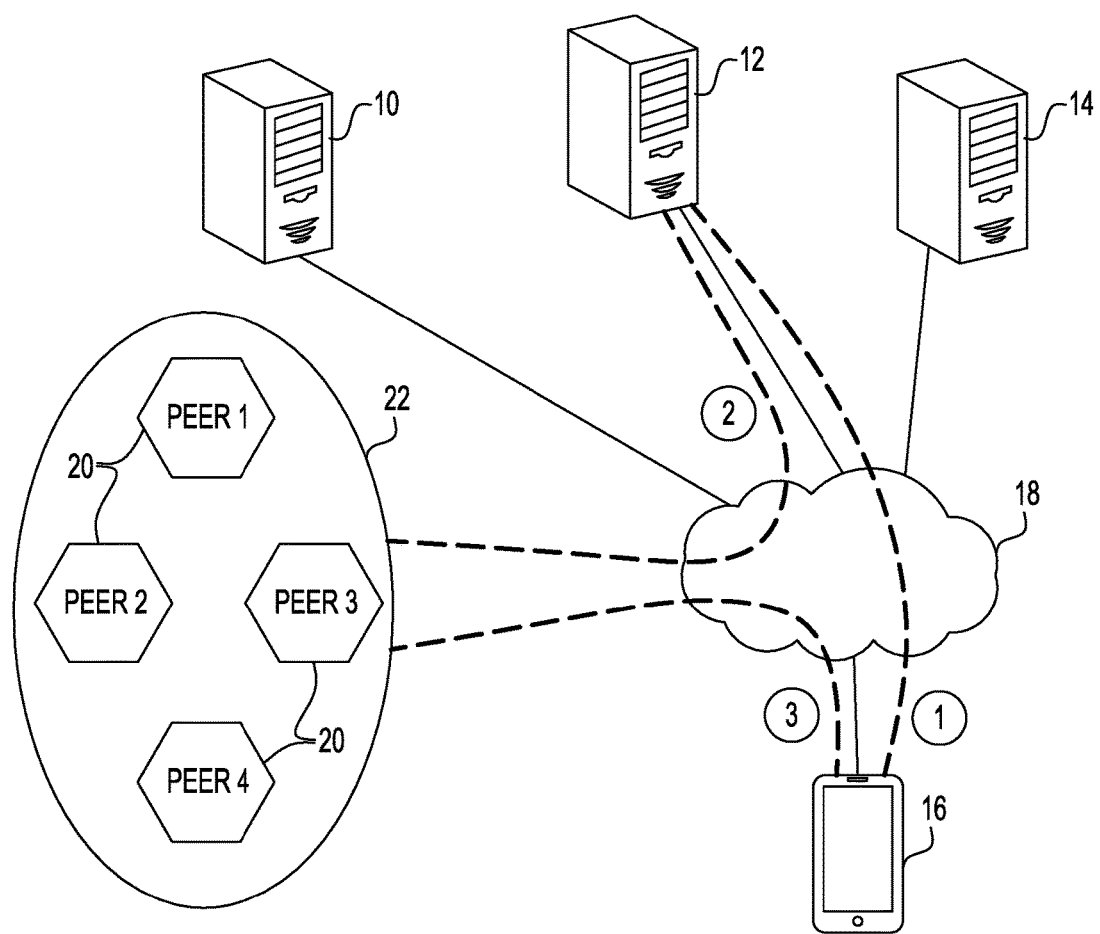
FIG. 1 illustrates a hybrid network for media streaming contemplated by the exemplary embodiments.

Referring to the Figures in more detail, and particularly referring to FIG. 1, there is illustrated a hybrid network contemplated by the exemplary embodiments. Servers 10, 12, 14 may contain media content (hereafter just "content") that is shared with authorized subscribers. The servers 10, 12, 14 may make up the CDN. The number of servers in the CDN are only for the purpose of illustration and not limitation. In the CDN, there may be more than three servers or less than three servers.

A subscriber having a viewing device 16 may wish to stream content from the servers 10, 12, 14. For the purpose of illustration and not limitation, server 12 may actually be chosen to stream the content to viewing device 16. While viewing device 16 may be a handheld device, it alternatively may be any device capable of receiving streamed content and viewing the streamed content.

Streaming content is content that may be constantly received by and presented to an end-user on a viewing device while being delivered by a content provider such as a CDN. The verb "to stream" refers to the process of delivering content in this manner; the term refers to the delivery method of the medium, rather than the medium itself, and is an alternative to file downloading. A viewing device may begin to play the content (such as a movie) before the entire file has been transmitted.

The server 12 and the viewing device 16 may be connected by a network such as the Internet.

Under normal operating conditions, the server 12 and viewing device 16 may communicate with each other through the network 18 as indicated by the dashed line as path 1.

However, the viewing device 16 may encounter a situation where the streamed performance may be interrupted, or may be likely interrupted, for any of the reasons discussed above. To mitigate the interruption or likely interruption, the viewing device may take a corrective action.

The viewing device 16 recognizes there is an issue with the streamed content and sends a request to peer devices 20 seeking assistance. The request by the viewing device 16 is broadcast over the networks available to the viewing device 16 and the request is in a format understood by the peer devices 20. The request to the peer devices 20 would be sent using a peer-to-peer protocol. The peer network 22 would also be dynamically formed using the peer-to-peer protocol after the request by the viewing device 16 is broadcast. Not all accessible peer devices 20 may be capable of assisting the viewing device 16 so the peer network 22 is dynamically formed from the peer devices that are able to provide assistance to the viewing device 16. After the request by the viewing device is broadcast, the peer network 22 may be formed within seconds or ideally milliseconds after the broadcast.

Peers 20 in the peer network 22 may make a portion of their resources, such as processing power, disk storage or network bandwidth, directly available to other network participants, without the need for central coordination by servers or stable hosts. Peers 20 are both suppliers and consumers of resources, in contrast to the traditional client-server model in which the consumption and supply of resources is divided.

The viewing device 16 tells the peer devices 20 in the peer network 22 what content is being consumed by the viewing device 16 and where in the content the interruption is occurring or expected to occur. To replace or supplement the missing content experienced by the viewing device 16, the peers 20 will request the relevant content from the server 12. That is, the peers 20 in the peer network 22 communicate directly with the server 12 through the network 18 as indicated by the dashed line as path 2 to request and obtain the relevant content.

Peers 20 in the peer network 22 interact and nominate and agree which part (segment) of the content each peer 20 is requesting from server 12. In this way, each peer 20 may request a different segment of the content. In one example, for the purpose of illustration and not limitation, if the interruption is expected at the 8 minute mark device, peer 1 in peer network 22 will request content from the 7 minute 55 seconds mark while peer 2 in peer network 22 will be aware of peer 1's request and request content from the 8 minute 20 seconds mark.

Each peer 20 will receive the requested content and relay the requested content directly to the viewing device 16 through the network 18 as indicated by the dashed line as path 3. The viewing device 16 may cache the content and form a continuous media file to play to the viewer. While it is possible, and even likely, that different peers 20 may request the same segment from the server 12, duplicate requests would not be a problem as the viewing device 16 will recognize the duplication and form a single media file.

It is preferred that the peers 20 in peer network 22 be properly authenticated so that media companies that provide the content do not lose control of their content. Each viewing session may have a session key provided by the CDN that confirms the viewing device 16 has legitimate access to the content. For example, as an illustration of one exemplary embodiment, the viewing device 16 requests a new viewing session start by sending a request to the CDN (server 12 in this case) to start streaming to the viewing device 16. The server 12 authenticates the viewing device 16 and confirms that there is a subscription in place and generates a session key for the viewing device 16. The viewing device 16 then sends a request to the peers 20 in the peer network 22 for the same content. The viewing device 16 presents the session key to the peer devices 20 which presents the session key to the authentication service of the server 12 confirms the session key is authentic. The peers 20 may already have the requested content cached. Alternatively, the peers 20 may retrieve the requested content from the server 12. In either case, the viewing device 16 has the content streamed to it from a peer 20, as indicated by path 3, rather than from the server 12.

The exemplary embodiments thus may reduce the load on the servers 10, 12, 14 and on the network and the authentication capability prevents fraudulent requests to access content.

Figure 2:
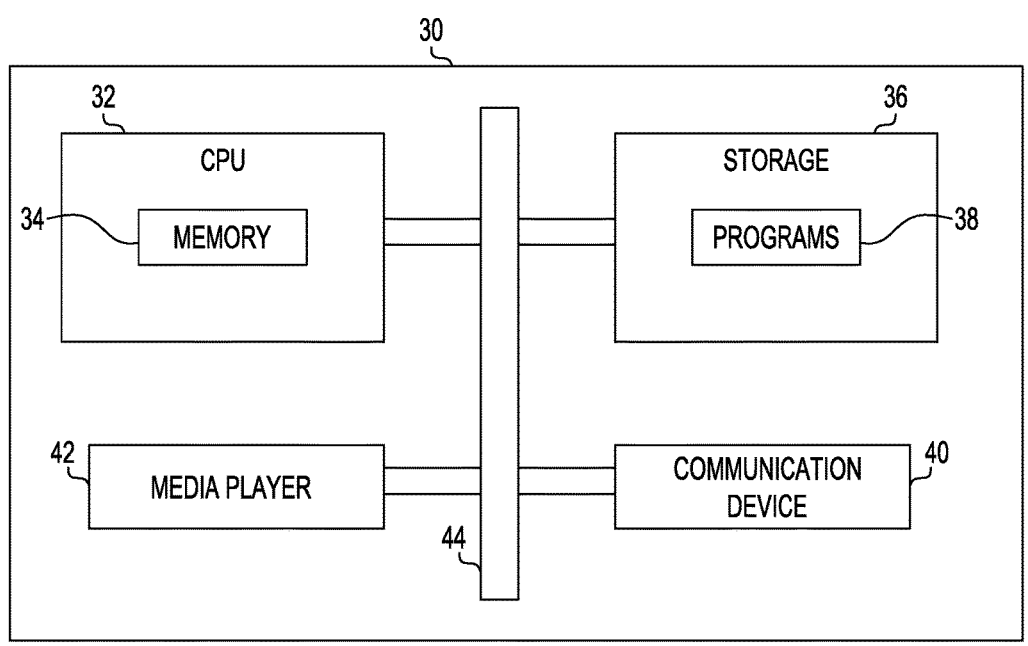
FIG. 2 illustrates a computing device for use in the exemplary embodiments.

Referring now to FIG. 2, there is illustrated an exemplary embodiment of a computing device 30 having a processor 32 (central processing unit (CPU)), memory 34 and non-transitory storage medium 36. Included within the storage medium 34 may be various programs 36. Computing device 30 may include one or more communication devices 40 to handle any communication capabilities such as cellular telephony, satellite transmission, Bluetooth short range radio and WiFi. Computing device 30 may further include a media player 42.

The media player 42 in conjunction with the programs 38 in non-transitory storage medium 36 may handle all of the functionalities required to request, stream, download and play any content from server 12 or any other CDN. Further, the media player 42 in conjunction with the programs 38 in non-transitory storage medium 36 may handle the functionalities required to set up a peer network, receive the segments from the peer network, stitch the segments together into a continuous media file and tear down the peer network when the interruption to the streamed media has passed.

The computing device 30 may further include a bus 44 to connect all of the various components of the computing device 30.

Figure 3:
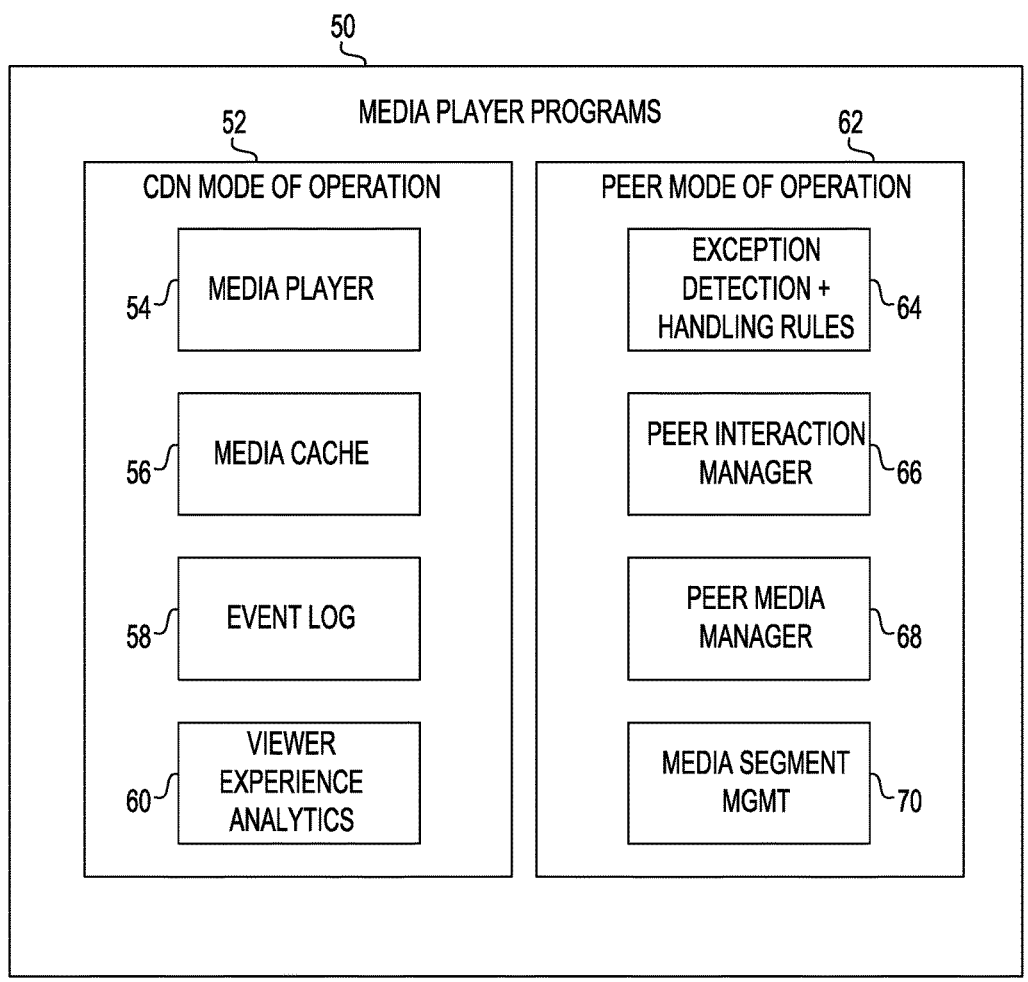
FIG. 3 illustrates media player programs stored in the computing device of FIG. 2.

Referring now to FIG. 3, there is described in further detail the media player programs 50 that may be stored in the programs 38 of the non-transitory storage medium 36. The media player programs 50 may be further functionally divided into at least two sections.

One section of programs may primarily operate when the content is streaming normally from the CDN to the viewing device 16. The functions of these programs may be grouped under the heading "CDN Mode of Operation" 52. There may be a media player function 54 which presents the content to the viewer on the viewing device 16 and a media cache 56 which may temporarily store the content that has been viewed as well as the content that is about to be viewed. There may also be an event log 58 which is a record of what events have happened and when these events occurred. Lastly, the CDN Mode of Operation 52 may further include viewer experience analytics 60 which analyzes events, packet data quality, network bandwidth and other factors of the content and measures end viewer experience when viewing the content. The viewer experience analytics 60 that may measure the end viewer experience may include video quality measures such as latency (delay), packet loss, packet delay and jitter.

Another section of programs may primarily operate when the content is interrupted, likely to be interrupted, for any reason including those reasons described previously. The functions of these programs may be grouped under the heading "Peer Mode of Operation" 62. There may be exception detection and handling rules 64 which receives information from the viewer experience analytics 60 and identifies changes such as when an interruption in the streaming has occurred to is likely to occur. That is, the viewer experience analytics 60 measure and predict the viewer experience and pass this information to the exception detection and handling rules 64 which may detect an interruption (now or imminent) and may invoke the peer mode of operation. In other words, the viewer experience analytics 60 identifies what is happening, and predicts what is likely to happen, and the exception detection and handling rules 64 acts on the findings of the viewer experience analytics 60.

In these circumstances, the exception detection and handling rules 64 may invoke the Peer Mode of Operation 62. The peer interaction manager 66 is a signaling or control plane capability that may broadcast a request to peers for assistance. The functions requesting and managing the P2P network set up and tear down may reside in the peer interaction manager 66. The peer media manager 68 is a media plane function that receives the media segments from peers and caches them. The media segment manager 70 may stitch the discrete media segments from different peers into a single continuous media file and inserts the media file into the media cache 56 for playing by the media player 54.

Figure 4:
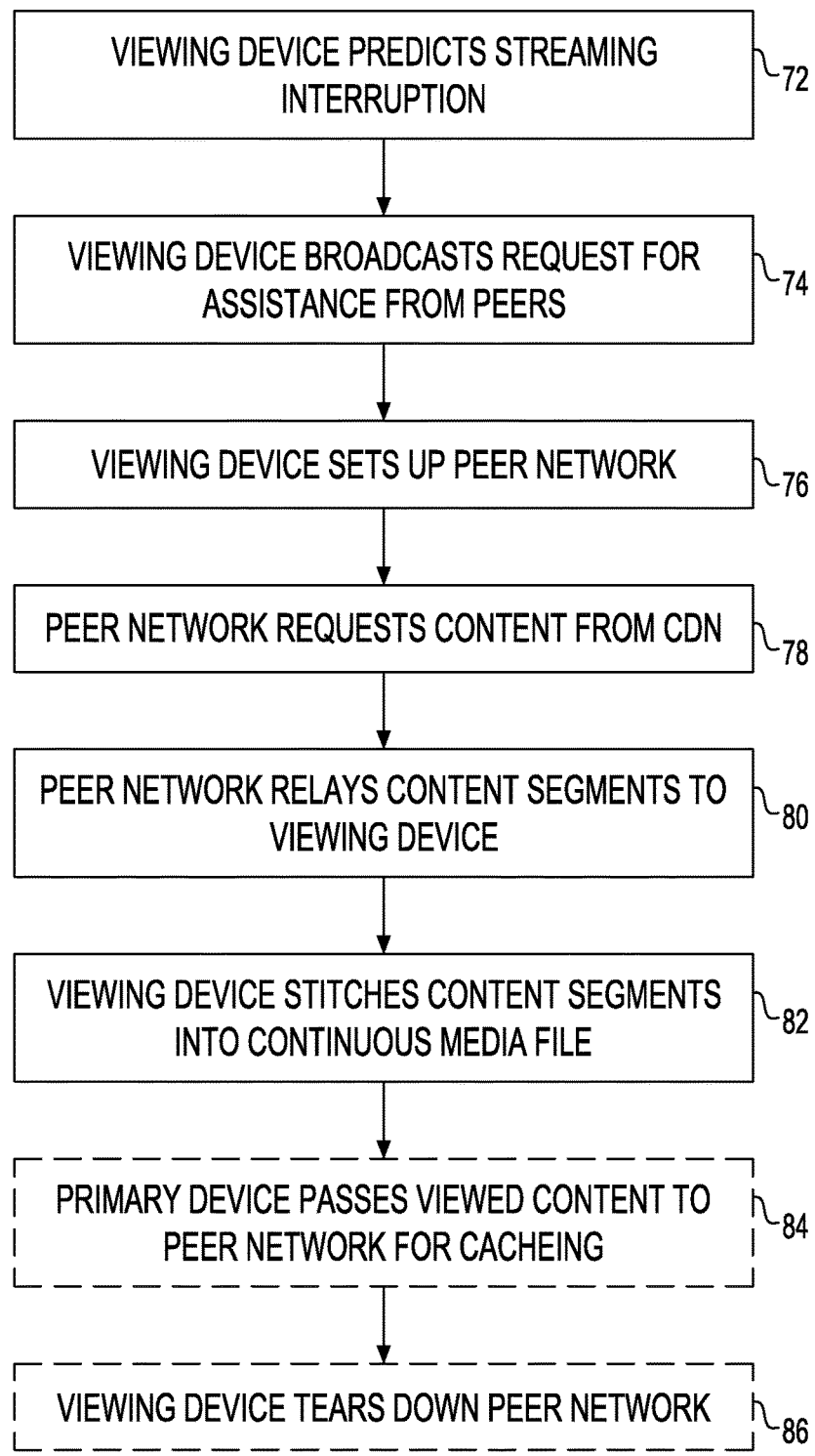
FIG. 4 illustrates an exemplary method for media streaming.

Referring now to FIG. 4, there is illustrated an exemplary method for media streaming. In step 72, the viewing device 16 predicts a streaming interruption that is presently occurring or is likely to occur. The viewing device 16 may then broadcast a request for assistance from peers, step 74.

The viewing device 16 may then set up a peer network, step 76, and then suitable peers within the peer network respond and request appropriate content in the form of content segments from the CDN and have those content segments streamed to them, step 78.

The peer network relays the content segments to the viewing device 16, step 80, and then the viewing device stitches the content segments from the peer network with any content segments received directly from the CDN into a continuous media file, step 82, to provide a seamless viewing experience.

In an optional step, the viewing device 16 may pass content which has already been viewed to a peer device in the peer network for cacheing, step 84. This cached content may be retrieved later on during, for example, a rewind operation.

In a further optional step, the viewing device 16 may tear down the peer network after the streaming interruption has passed, step 86.

Figure 5:
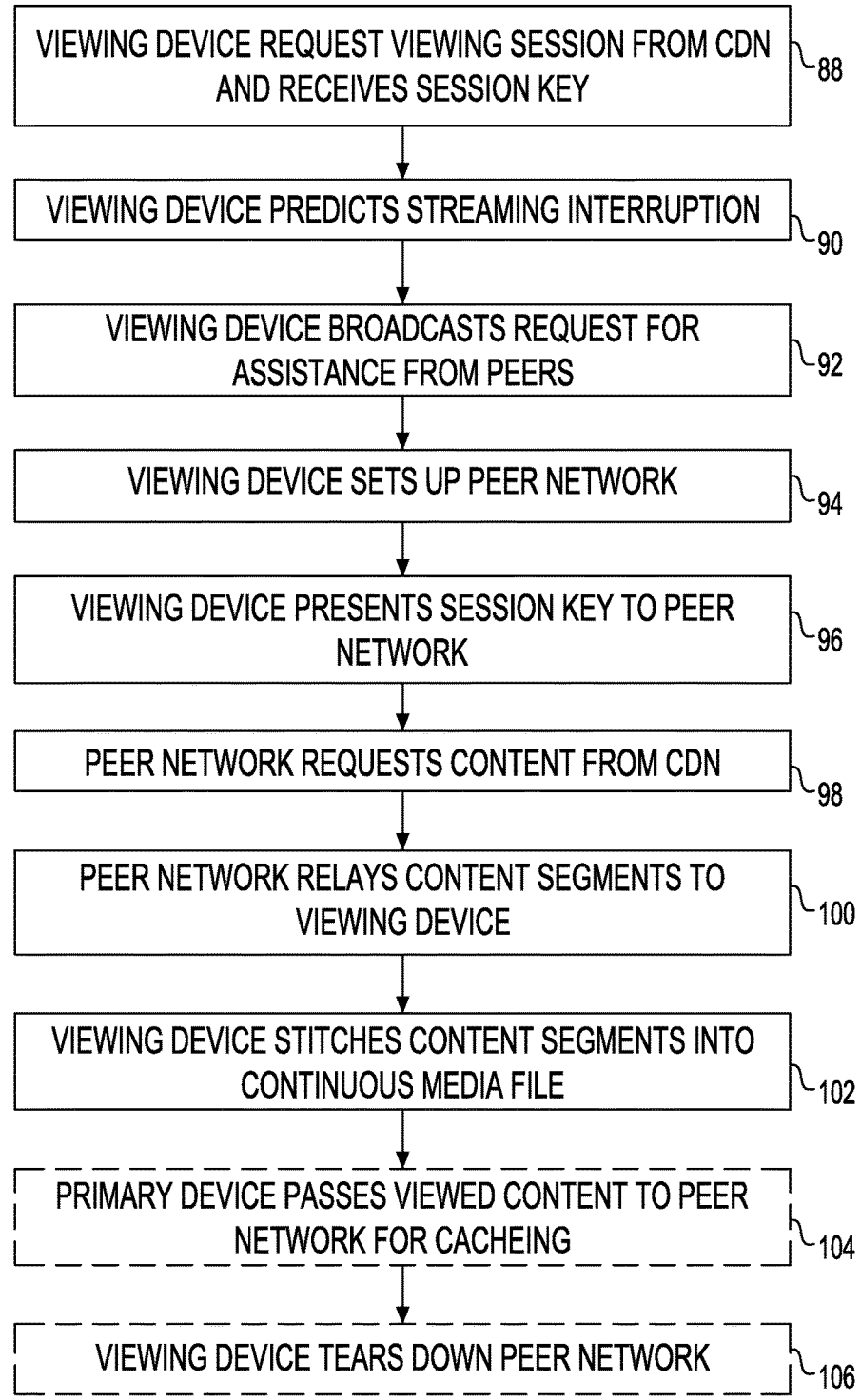
FIG. 5 illustrates another exemplary method for media streaming.

Referring now to FIG. 5, there is illustrated another exemplary method for media streaming. In this exemplary embodiment, the viewing device 16 receives a session key from the CDN to confirm that the viewing device 16 has legitimate access to the content. The session key may be passed to the peers of the peer network so that the peer network can request and receive content from the CDN. This authorized content may then be relayed to the viewing device 16.

In step 88, the viewing device 16 requests a viewing session from a CDN, such as server 12, and receives a session key from the CDN.

In step 90, the viewing device 16 predicts a streaming interruption that is presently occurring or is likely to occur. The viewing device 16 may then broadcast a request for assistance from peers, step 92.

The viewing device 16 may then set up a peer network, step 94, and presents the session key to the peer network, step 96.

Suitable peers within the peer network respond and request appropriate content in the form of content segments from the CDN and have those content segments streamed to them, step 98. The peers may present their session key to the CDN to confirm that they have legitimate access to the requested content.

The peer network relays the content segments to the viewing device 16, step 100, and then the viewing device stitches the content segments from the peer network with any content segments received directly from the CDN into a continuous media file, step 102, to provide a seamless viewing experience.

In an optional step, the viewing device 16 may pass content which has already been viewed to a peer device in the peer network for cacheing, step 104. This cached content may be retrieved later on during, for example, a rewind operation.

In a further optional step, the viewing device 16 may tear down the peer network after the streaming interruption has passed, step 106.

The exemplary embodiments may be further illustrated by the following examples.

Example 1—Primary Use Case

In one use case, the viewing device analyzes the rate of streaming and other factors, such as network bandwidth, and recognizes when viewing will be delayed because of the need to wait and buffer media.

The viewing device sends an alert to peers requesting the peer devices dynamically form a P2P network with the viewing device and participate in a P2P media streaming collaboration that augments the streaming service being provided by the CDN.

Peer devices that join the dynamic P2P network act as a proxy for the viewing device and request the same streaming content from the CDN. The streaming content can be requested over the same network or a different network and may be requested from the same CDN server, a different server in the same CDN network or a different CDN network. The streaming content is requested in a format suitable to the viewing device. The content is requested to start from specific frames in the media content. The received content is cached on the peer device and relayed to the viewing device which orders the segments of content into the correct sequence for viewing.

In this way, nearby peer devices with different wide area network connectivity can be invoked or requested to prefetch content over a different network or from a different CDN server when the viewing device recognizes performance is being degraded due to network congestion or the CDN being constrained.

The exemplary embodiments enable the viewing device to enlist the assistance of other devices to continue to receive content and deliver the viewing service unimpeded.

The exemplary embodiments allow the viewing device device to enlist the support of peer devices when viewing is actually interrupted due to buffering issues or—preemptively request assistance when, having monitored the streaming session, the viewing device predictively identifies when viewing interruption is likely to occur.

Example 2—Group Prediction Use Case

Over time, a set of viewing devices monitor the performance of a set of streaming sessions and together with the peer devices develop a group predictive model that identifies when viewing interruption is likely to occur. The group predictive model may be used to recognize likely periods of performance issues and initiate proactive steps that avoid the performance issue. An example may be when a popular streaming media event such as a season final episode of a television show is being released. Each peer device in the group requests a different chapter in the episode and once received from the CDN, the chapters are preemptively moved across the peer network to minimize the likelihood of the streaming session being interrupted on any one device.

The success of the group predictive model is tracked over time and may be used to guide prospective new peers about the likely performance of streaming services should the new peer join the group.

The Group Prediction model also may use recursive analytics to identify the streaming history for specific devices (or users or networks) and assign dynamic "risk/reliability rating tokens" to them. By risk/reliability rating, the exemplary embodiments provide the capability for all devices in the P2P network to track and compare contributions of each device in the P2P network over time, and form a view on which have reliably and consistently contributed to avoiding or ameliorating streaming issues. Such information may be used by the peer interaction manager to decide what tasks to give to what peer devices 20. In one example, a peer with a low performance history may not receive a task. In another example, "this device is known to have had recurring streaming problems in the past, hence there is a high risk of distressing the streaming service if this device joins now". Such risk/reliability rating helps distributed networks prevent too many high risk rated devices from joining.

Example 3—Overflow Use Case

In another use case, the viewing device may enlist the assistance of a peer device to store the content that has already been viewed but can no longer be stored on the viewing device because, for example, the buffers on the viewing device are full. The peer device received and caches the viewed content and returns it to the viewing device when the user rewinds the video and watches a scene for a second time.

In this way a nearby device on the same network or a different network may buffer content that was just watched on behalf of the viewing device if the content is needed again.

Example 4—Other Use Cases

The exemplary embodiments may also adapt its peer network caching policy and behavior to the viewer's behavior. For example, if a person always watches a sport match replay when their team wins, the sports match would then always be cached on a peer device.

In a further use case, the viewing device may be on a network connection that is at a high cost. The viewing device polls peer devices to identify peer devices that can incur the cost of the network connection. In this way, the peer devices act as a proxy and receive the content over a cheaper network connection and relay it to the viewing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A hybrid device for viewing media content comprising:
a media player to present the media content to a viewer;
a non-transitory storage medium that stores instructions; and
a processor that executes the instructions to perform the following functions:
    exception detection and handling to monitor a rate of media streaming and to identify when viewing of the media content is interrupted or predicted to be interrupted;
    a peer interaction manager having a signaling capability to broadcast a request to peers for media segments of the media content when viewing of the media content is interrupted or predicted to be interrupted;
    a peer media manager to receive the media segments from the peers and cache the media segments;
    a media segment manager to stitch the media segments from different peers into a single continuous media file and insert the media file into the media player for playing to the viewer;
    dynamically forming a peer network of the peers having access to the media segment and tearing down the peer network when viewing of the media content is no longer interrupted or predicted to be interrupted.

2. The hybrid device of claim 1 wherein the processor further comprising performing a function comprising a security manager to send a request to a content distribution network to start streaming of the media content, to receive a session key from the content distribution network, and to present the session key to the peers to authorize the peers to receive the media content from the content distribution network prior to the peer media manager to receive the media segments.

3. The hybrid device of claim 1 wherein the processor further comprising a function of viewer experience analytics to measure and predict a viewing experience including video quality measures.

4. The hybrid device of claim 3 wherein the video quality measures include one or more of latency, packet loss, packet delay and jitter.

5. The hybrid device of claim 3 wherein the exception detection and handling uses the viewer experience analytics to monitor the rate of media streaming and to identify when viewing of the media content is interrupted or predicted to be interrupted.

6. The hybrid device of claim 1 wherein viewing of the media content is interrupted or predicted to be interrupted due to a buffering issue or a network bandwidth issue.

7. A computer implemented hybrid method for viewing media content comprising:
    monitoring by a viewing device a rate of media streaming and identifying by the viewing device when viewing of the media content is interrupted or predicted to be interrupted;
    broadcasting by the media device a request to peers for media segments of the media content when viewing of the media content is interrupted or predicted to be interrupted;
    receiving by the media device the media segments from the peers and caching the media segments;
    stitching by the media device the media segments from different peers into a single continuous media file and inserting the media file into a media player for playing to a viewer; and
    dynamically forming a peer network of the peers having access to the media segment and tearing down the peer network when viewing of the media content is no longer interrupted or predicted to be interrupted.

8. The method of claim 7 further comprising sending a request to a content distribution network to start streaming of the media content, receiving a session key from the content distribution network, and presenting the session key to the peers to authorize the peers to receive the media content from the content distribution network prior to receiving by the media device the media segments.

9. The method of claim 7 wherein viewing of the media content is interrupted or predicted to be interrupted due to a buffering issue or a network bandwidth issue.

10. The method of claim 7 wherein monitoring the rate of media streaming and identifying when viewing of the media content is interrupted or predicted to be interrupted is by analyzing the media content for a viewing experience including video quality measures.

11. The method of claim 10 wherein the video quality measures include one or more of latency, packet loss, packet delay and jitter.

12. A computer program product for viewing media content, the computer program product comprising a computer readable storage medium having program instructions embodied therewith, the program instructions executable by a processor to cause the processor to perform a method comprising:
    monitoring a rate of media streaming and identifying by the viewing device when viewing of the media content is interrupted or predicted to be interrupted;
    broadcasting a request to peers for media segments of the media content when viewing of the media content is interrupted or predicted to be interrupted;
    receiving the media segments from the peers and caching the media segments;
    stitching the media segments from different peers into a single continuous media file and inserting the media file into a media player for playing to a viewer; and
    dynamically forming a peer network of the peers having access to the media segment and tearing down the peer network when viewing of the media content is no longer interrupted or predicted to be interrupted.

13. The computer program product of claim 12 further comprising sending a request to a content distribution network to start streaming of the media content, receiving a session key from the content distribution network, and presenting the session key to the peers to authorize the peers to receive the media content from the content distribution network prior to receiving by the media device the media segments.

14. The computer program product of claim 12 wherein monitoring the rate of media streaming and identifying when viewing of the media content is interrupted or predicted to be interrupted is by analyzing the media content for a viewing experience including video quality measures.

* * * * *